E. T. Colburn,
Clothes Sprinkler.
№ 51,509.      Patented Dec. 12, 1865.

Witnesses;           Inventor;

J. W. B. Orington      E. T. Colburn

Wm. E. Lynn        Munn & Co
                       Attorneys

UNITED STATES PATENT OFFICE.

E. T. COLBURN, OF BOSTON, MASSACHUSETTS, ASSIGNOR TO HIMSELF AND WM. P. & ISAAC GANNETT.

CLOTHES-SPRINKLER.

Specification forming part of Letters Patent No. 51,509, dated December 12, 1865.

*To all whom it may concern:*

Be it known that I, E. T. COLBURN, of Boston, in the county of Suffolk and State of Massachusetts, have invented a new and Improved Clothes-Sprinkler; and I do hereby declare that the following is a full, clear, and exact description thereof, which will enable others skilled in the art to make and use the same, reference being had to the accompanying drawings, forming part of this specification.

The present invention relates to a novel hand device or implement to be used for sprinkling clothes previous to being ironed; and it consists in combining with a closed vessel or reservoir for the water employed, having one of its ends finely perforated, a hollow valve-stem or tube, so arranged therein that by opening the valve the vessel can be filled with water, the air escaping therefrom through its hollow stem or tube, when, the valve being closed and so held by depressing its stem with the thumb or finger of the hand in which the implement is held, the escape of the water from and the entrance of air to the vessel is prevented, the water, when so desired, by simply shaking the vessel with the hand, then being thrown out of the same either in greater or lesser quantities, according to the force with which it is so shaken, as will be apparent from the following detail description of the implement, reference being had to the accompanying plate of drawings, of which—

Figure 1:
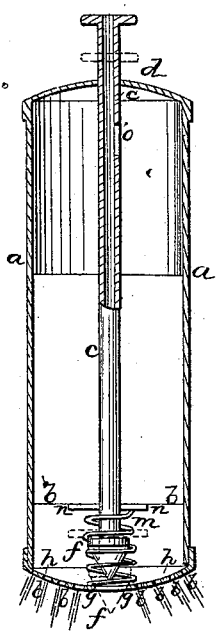
Figure 2:
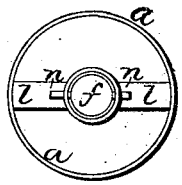

Figure 1 is a central section through the implement, taken in the direction of its length; and Fig. 2, a view of one end of the water-vessel, with its perforated head or end removed.

$a\ a$ in the drawings represent the water reservoir or vessel, made of a cylindrical or other suitable shape, but of such a size as to be conveniently handled and grasped by the hand, and of sheet tin, brass, or other metal or material. This vessel is closed at both ends, but at one is perforated with a series of fine apertures, $b\ b$, of any desired number.

$c$ is a hollow stem or tube extending entirely through the length of the vessel $a$, and in its central axis projecting therefrom at its closed end $d$, through which it loosely passes. This tube $c$ is open at its outer end, and communicates through an aperture, $o$, in its side, at or near the closed end of the water-reservoir, with the interior of the same, and to its inner end is secured a conical-shaped valve or head, $f$, which has a seat or comes to a bearing, when the stem is depressed, in the central aperture, $g$, of the perforated head $h$.

$l$ is a cross-bar upon the inside of the water-vessel, at or near its perforated end, through which the valve-stem passes, it serving to guide and steady the valve-stem in its operation, to be presently explained. Between the cross-bar and the perforated end of the water-reservoir, and around the valve-stem, is a spiral spring, $m$, bearing at one end against the said perforated head, and at the other against the arm $n$, on each side of the stem, this spring, when the valve is closed by pressing down upon the outer end of its stem, being compressed thereby, so that when such pressure is removed the valve will be immediately thrown back to its original position, or, in other words, opened.

When the device or implement above explained is to be used, it is first filled with water by dipping it into a basin containing it, the water passing into the vessel through its valve, which is then open, and the air escaping through the hollow stem or tube, when depressing the stem by bearing down upon its outer end with the thumb or finger of the hand in which the implement is held, the valve for the passage of the water is closed, as well as the open end of the air-passage through the valve-stem, whereby the water is retained in the vessel, from which, by then simply shaking, with the hand, it can be thrown in greater or lesser quantities through its perforated head, according to the force with which it is so shaken, as is obvious without further explanation, the vessel, after being so emptied of its contents, being filled again as above described, and so on, as long as desired.

What I claim as new, and desire to secure by Letters Patent, is—

The clothes-sprinkler herein described, the same consisting of a water-reservoir provided with a hollow valve stem or tube, arranged so as to operate substantially in the manner specified.

E. T. COLBURN.

Witnesses:
CHARLES MCARDON,
WILLIAM ATKINSON.